(12) United States Patent
Koziatek

(10) Patent No.: US 12,526,306 B2
(45) Date of Patent: Jan. 13, 2026

(54) SYSTEMS, METHODS, AND MEDIA FOR MANAGING VULNERABILITY RISKS

(71) Applicant: Michael Koziatek, Winter Garden, FL (US)

(72) Inventor: Michael Koziatek, Winter Garden, FL (US)

( * ) Notice: Subject to any disclaimer, the term of this patent is extended or adjusted under 35 U.S.C. 154(b) by 183 days.

(21) Appl. No.: 18/615,423

(22) Filed: Mar. 25, 2024

(65) Prior Publication Data

US 2025/0301010 A1  Sep. 25, 2025

(51) Int. Cl.
*H04L 9/40* (2022.01)

(52) U.S. Cl.
CPC .............. *H04L 63/1433* (2013.01)

(58) Field of Classification Search
CPC .................................. H04L 63/1433
See application file for complete search history.

(56) References Cited

U.S. PATENT DOCUMENTS

| | | | | |
|---|---|---|---|---|
| 2014/0237545 A1* | 8/2014 | Mylavarapu | ........ | H04L 63/1441 726/25 |
| 2021/0014263 A1* | 1/2021 | Soroush | .................. | G06F 21/57 |
| 2021/0211452 A1* | 7/2021 | Patel | .................. | H04L 63/1416 |
| 2022/0210196 A1* | 6/2022 | Parekh | ................ | H04L 63/0227 |
| 2023/0018096 A1* | 1/2023 | Ueda | ...................... | H04L 63/145 |
| 2024/0364725 A1* | 10/2024 | Sinha | .................. | H04L 63/1416 |
| 2025/0141912 A1* | 5/2025 | Hill | ...................... | H04L 63/1433 |

* cited by examiner

*Primary Examiner* — Kostas J Katsikis
(74) *Attorney, Agent, or Firm* — The Rapacke Law Group, P.A.

(57) ABSTRACT

The disclosed systems, methods, and media for managing vulnerability risks can cause a vulnerability management dashboard to be presented which identifies a plurality of vulnerabilities; determine that a first vulnerability is indicated as requiring high privileges to be exploited based at least on first data about the plurality of vulnerabilities; associate the first vulnerability with a first vulnerability category based at least on the determination that the first vulnerability is indicated as requiring high privileges to be exploited; receive a request to filter the plurality of vulnerabilities based at least on the first vulnerability category; in response to receiving the request to filter the plurality of vulnerabilities based at least on the first vulnerability category, determine that a first portion of the plurality of vulnerabilities are associated with the first vulnerability category; and prevent the first portion of the plurality of vulnerabilities from being presented in the dashboard.

20 Claims, 10 Drawing Sheets

SYSTEMS, METHODS, AND MEDIA FOR MANAGING VULNERABILITY RISKS

TECHNICAL FIELD

Embodiments disclosed herein can relate to systems, methods, and media for managing vulnerability risks.

BACKGROUND

The current common vulnerability scoring system (CVSS) has several shortcomings. With additional context of the common vulnerabilities and exposures (CVE) data, such as Attack Vector of the vulnerability, different companies are better able to protect against different attacks. There are several metrics a business will use to consider the risks associated with each CVE, and these CVEs can be grouped based on these metrics. The largest advantage will come with Zero-Trust and suppressing vulnerabilities that are local and require privileges to exploit. This will help businesses prioritize the vulnerabilities based on context versus a blind CVSS score.

SUMMARY

This summary is provided to introduce a variety of concepts and/or aspects in a simplified form that is further disclosed in the detailed description, below. This summary is not intended to identify key or essential inventive concepts of the claimed subject matter, nor is it intended for determining the scope of the claimed subject matter.

A system of one or more computing devices can be configured to perform particular processes by virtue of having software, firmware, hardware, or a combination thereof installed on the system that in operation causes or cause the system to perform the processes.

In some embodiments, a system for managing vulnerability risks can include: memory; and one or more processors configured at least to: receive first data about a plurality of vulnerabilities; cause a vulnerability management dashboard to be presented, the vulnerability management dashboard identifying the plurality of vulnerabilities; determine that a first vulnerability of the plurality of vulnerabilities is indicated as requiring a high level of privileges to be exploited based at least on the first data about the plurality of vulnerabilities; associate the first vulnerability with a first vulnerability category based at least on the determination that the first vulnerability of the plurality of vulnerabilities is indicated as requiring a high level of privileges to be exploited; receive a request to filter the plurality of vulnerabilities based at least on the first vulnerability category; in response to receiving the request to filter the plurality of vulnerabilities based at least on the first vulnerability category, determine that a first portion of the plurality of vulnerabilities are associated with the first vulnerability category; and prevent the first portion of the plurality of vulnerabilities from being presented in the vulnerability management dashboard.

In some embodiments, the one or more processors can be configured to perform any processes or subprocesses disclosed herein.

In some embodiments, a method for managing vulnerability risks can include: receiving first data about a plurality of vulnerabilities; causing a vulnerability management dashboard to be presented, the vulnerability management dashboard identifying the plurality of vulnerabilities; determining that a first vulnerability of the plurality of vulnerabilities is indicated as requiring a high level of privileges to be exploited based at least on the first data about the plurality of vulnerabilities; associating the first vulnerability with a first vulnerability category based at least on the determination that the first vulnerability of the plurality of vulnerabilities is indicated as requiring a high level of privileges to be exploited; receiving a request to filter the plurality of vulnerabilities based at least on the first vulnerability category; in response to receiving the request to filter the plurality of vulnerabilities based at least on the first vulnerability category, determining that a first portion of the plurality of vulnerabilities are associated with the first vulnerability category; and preventing the first portion of the plurality of vulnerabilities from being presented in the vulnerability management dashboard.

In some embodiments, the method can include any processes or subprocesses disclosed herein.

In some embodiments, a non-transitory computer-readable medium can comprise instructions, that when executed by one or more processors, cause the one or more processors to perform a method for managing vulnerability risks, the method comprising: receiving first data about a plurality of vulnerabilities; causing a vulnerability management dashboard to be presented, the vulnerability management dashboard identifying the plurality of vulnerabilities; determining that a first vulnerability of the plurality of vulnerabilities is indicated as requiring a high level of privileges to be exploited based at least on the first data about the plurality of vulnerabilities; associating the first vulnerability with a first vulnerability category based at least on the determination that the first vulnerability of the plurality of vulnerabilities is indicated as requiring a high level of privileges to be exploited; receiving a request to filter the plurality of vulnerabilities based at least on the first vulnerability category; in response to receiving the request to filter the plurality of vulnerabilities based at least on the first vulnerability category, determining that a first portion of the plurality of vulnerabilities are associated with the first vulnerability category; and preventing the first portion of the plurality of vulnerabilities from being presented in the vulnerability management dashboard.

In some embodiments, the non-transitory computer-readable medium can comprise instructions, that when executed by one or more processors, cause the one or more processors to perform any processes or subprocesses disclosed herein.

BRIEF DESCRIPTION OF THE DRAWINGS

A complete understanding of the present features or aspects and the advantages and features thereof will be more readily understood by reference to the following detailed description when considered in conjunction with the accompanying drawings wherein.

DETAILED DESCRIPTION

Figure 1:
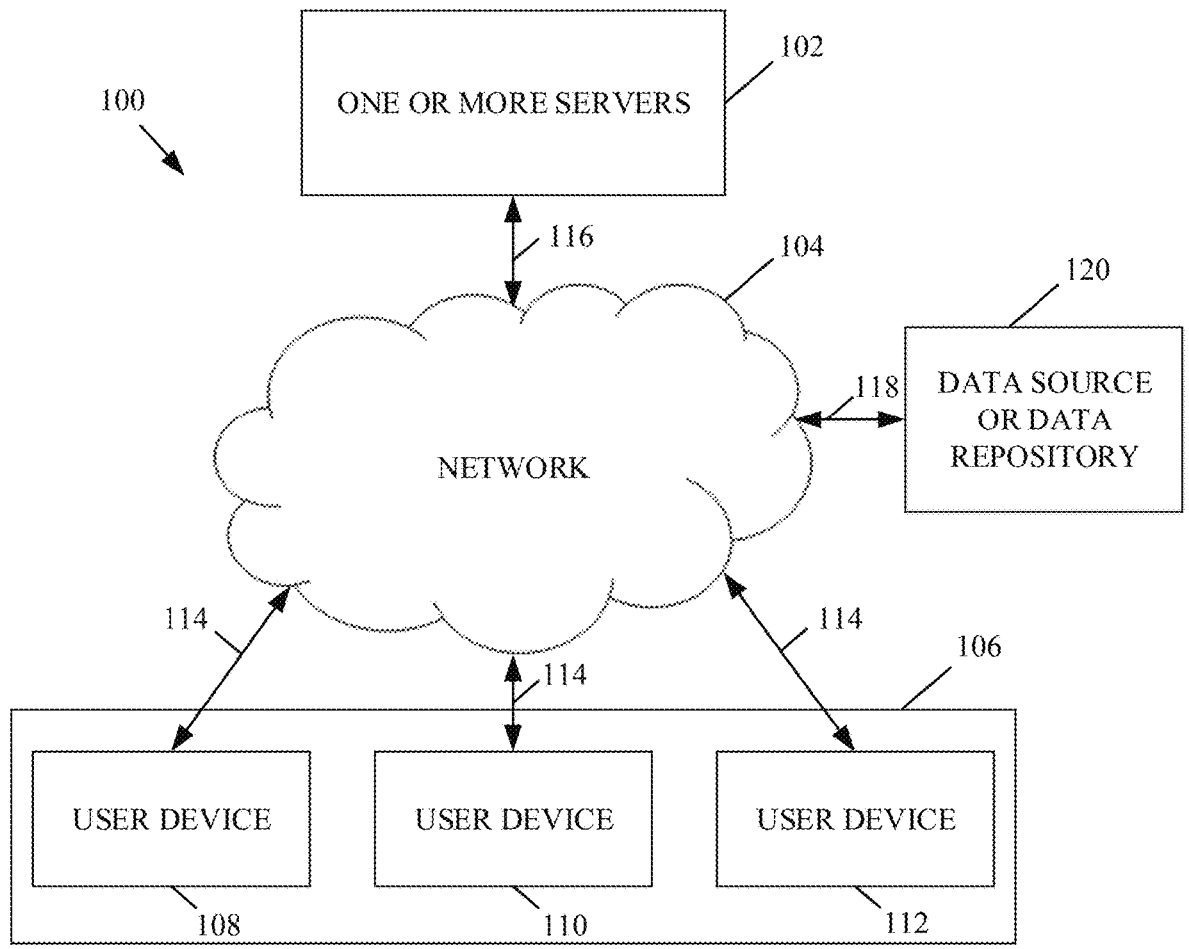
FIG. 1 illustrates a block diagram of a system for managing vulnerability risks, according to some embodiments disclosed herein.

Any specific details of features or aspects are used for demonstration purposes only, and no unnecessary limitations or inferences are to be understood therefrom.

Before describing in detail exemplary aspects, it is noted that the aspects reside primarily in combinations of components and procedures related to the systems, methods, and media disclosed herein. Accordingly, the systems, methods, and media components and processes have been represented where appropriate by conventional symbols in the drawings, showing only those specific details that are pertinent to understanding the aspects of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship, or order between such entities or elements. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary aspects of the inventive concepts defined in the appended claims. Hence, specific steps, process order, dimensions, component connections, and other physical characteristics relating to the aspects disclosed herein are not to be considered as limiting, unless the claims expressly state otherwise. The use or mention of any single element contemplates a plurality of such element, and the use or mention of a plurality of any element contemplates a single element (for example, "a device" and "devices" and "a plurality of devices" and "one or more devices" and "at least one device" contemplate each other), regardless of whether particular variations are identified and/or described, unless impractical, impossible, or explicitly limited.

Embodiments of the disclosed system can relate to systems, methods, and media for identifying and prioritizing cybersecurity vulnerabilities based on common vulnerabilities and exposures (CVE) data. The CVE data can be retrieved from any suitable CVE databases available over the Internet.

In some embodiments, the CVE data can indicate that a vulnerability requires a high level of privileges to be exploited. A vulnerability indicated as requiring a high level of privileges to be exploited can require administrator privileges to be exploited. In some embodiments, the CVE data can indicate that a vulnerability requires a low level of privileges to be exploited. A vulnerability indicated as requiring a low level of privileges to be exploited can require non-administrator user privileges to be exploited. In some embodiments, the CVE data can indicate that a vulnerability requires no privileges to be exploited.

In some embodiments, the vulnerabilities that are indicated as requiring a high level of privileges to be exploited can be deprioritized at least because those vulnerabilities are less likely to be exploited when protective measures are taken, such as, for example, implementing a zero-trust model. A zero-trust model can require multi-factor authentication for all logins and users, whether users have administrator privileges or not.

In some embodiments, the CVE data can indicate that an attack vector through which a vulnerability is exploitable is a network attack vector. A network attack vector can be indicated when a vulnerability is exploitable through a network connected to a system.

In some embodiments, the CVE data can indicate that an attack vector through which a vulnerability is exploitable is a physical attack vector. A physical attack vector can be indicated when a vulnerability requires any attacker to physically touch or physically manipulate any components or elements in a system to be exploited.

In some embodiments, the CVE data can indicate that an attack vector through which a vulnerability is exploitable is a local attack vector. A local attack vector can be indicated when a vulnerability is exploitable by 1) accessing the target system locally (e.g., keyboard, console), 2) using terminal emulation (e.g., SSH), or 3) relying on user interaction by another person to exploit the vulnerability.

In some embodiments, the CVE data can indicate that an attack vector through which a vulnerability is exploitable is an adjacent attack vector. An adjacent attack vector can be launched from the same shared proximity (e.g., Bluetooth, NFC, or IEEE 802.11) or a logical network (e.g., local IP subnet), or from within a secure or otherwise limited administrative domain (e.g., multiprotocol label switching, secure virtual private network within an administrative network zone).

A vulnerability management dashboard can identify a plurality of vulnerabilities present in a system. The vulnerability management dashboard can be used to prioritize or deprioritize the management of any vulnerabilities in the system based on any metrics included in the CVE data.

Referring to FIG. 1, a system 100 for managing vulnerability risks can be used with some embodiments disclosed herein. In some embodiments, the system 100 can comprise one or more servers 102, a network 104 (e.g., communication network), one or more user devices 106, or any combination thereof. In some embodiments, the one or more user devices 106 can include a first user device 108, a second user device 110, a third user device 112, or any combination thereof.

The one or more servers 102 can be any suitable server(s) for storing data, programs, or a combination thereof, for managing vulnerability risks. In some embodiments, the one or more servers 102 can include one or more computing devices. In some embodiments, the one or more servers 102 can store any suitable data about one or more vulnerabilities. For example, the data about the one or more vulnerabilities can include CVE data obtained from any suitable data source or data repository. Such data sources or data repositories can be publicly available through the network 104.

The network 104 can include a wired network, a wireless network, or a combination thereof. In some embodiments, the network 104 can include the Internet, an intranet, a wide-area network (WAN), a local-area network (LAN), a digital subscriber line (DSL) network, a frame relay network, an asynchronous transfer mode (ATM) network, a virtual private network (VPN), any other suitable communication network, or any combination thereof. In some embodiments, one or more communications links 114 can connect the one or more user devices 106 to the network 104. In some embodiments, one or more communication links 116 can connect the network 104 to the one or more servers 102. In some embodiments, one or more communication links 118 can connect the network 104 to one or more data sources or data repositories 120. The one or more communication links 114, 116, 118 can be any communication links suitable for communicating information between the one or more user devices 106, the one or more servers 102, and one or more data sources or data repositories 120 such as, for example, network links, dial-up links, wireless links, hard-wired links, any other suitable communications links, or any combination thereof.

The one or more user devices 106 can include any devices that are configured to request any data about any vulnerabilities from the one or more servers 102, and receive any data about any vulnerabilities from the one or more servers 102. For example, in some embodiments, the one or more user devices 106 can include one or more computing devices. The one or more computing devices can include a mobile device, such as a mobile phone, a tablet computer, a wearable computer, a laptop computer, a vehicle (e.g., a car, a boat, an airplane, or any other suitable vehicle), any other suitable mobile device, any suitable non-mobile device (e.g., a desktop computer, entertainment system, etc.), or any combination thereof. As another example, the one or more computing devices can include a media playback device, such as a television, a projector device, a game console, any other suitable computing device, or any combination thereof.

While the one or more servers 102 are illustrated as one device, the processes performed by the one or more servers 102 can be performed by any suitable number of computing devices in some embodiments.

Although three user devices 108, 110, 112 are shown in FIG. 1 to avoid over-complicating the figure, any suitable number of user devices can be used in some embodiments.

In some embodiments, the one or more servers 102 and the one or more user devices 106 can be implemented using any suitable hardware. For example, any device of the one or more servers 102 and the one or more user devices 106 can be implemented using any suitable general-purpose computer or special-purpose computer. Any general-purpose computer or special-purpose computer can include any suitable hardware.

Figure 2:
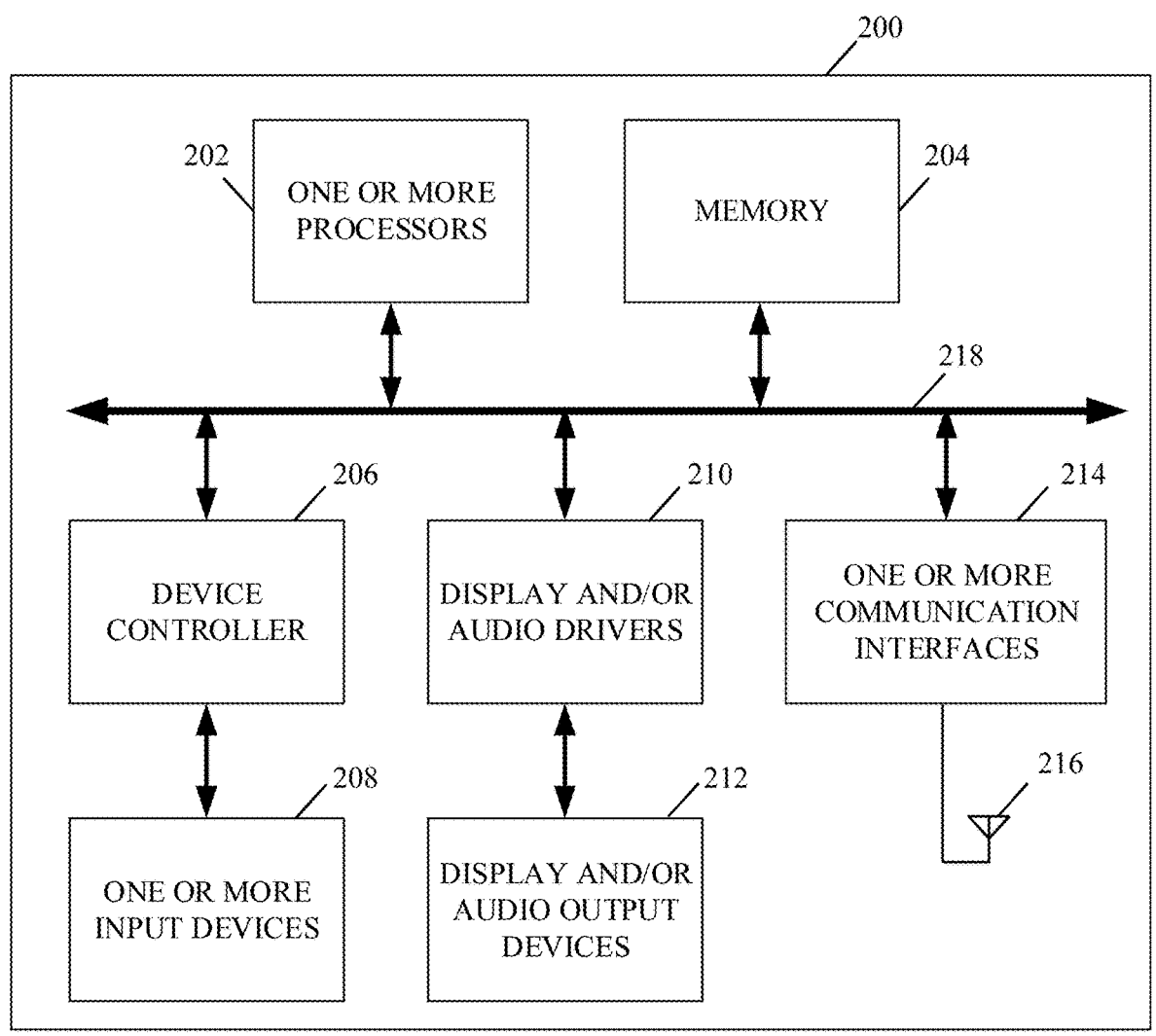
FIG. 2 illustrates a block diagram of a computing device for managing vulnerability risks, according to some embodiments disclosed herein.

Referring to FIG. 2, an example hardware of a computing device 200 is illustrated. In some embodiments, the computing device 200 can include one or more processors 202, memory 204, a device controller 206, one or more input devices 208, display and/or audio drivers 210, display and/or audio output devices 212, one or more communication interfaces 214, one or more antennas 216, a bus 218, or any combination thereof.

In some embodiments, the one or more processors 202 can include any suitable hardware processor, such as a central processing unit (CPU), a graphics processing unit (GPU), a tensor processing unit (TPU), an accelerated processing unit (APU), any other type of processing unit, or any combination thereof. In some embodiments, the one or more processors 202 can include a microprocessor, a microcontroller, a digital signal processor, dedicated logic, an application-specific integrated circuit (ASIC), a field programmable gate array (FPGA), an accelerator (e.g., an artificial intelligence (AI) accelerator or a cryptographic accelerator), any other suitable circuitry for controlling the functioning of a general purpose computer or a special purpose computer, or any combination thereof.

In some embodiments, one or more processors 202 of any server of the one or more servers 102 can be controlled by a server program stored in memory 204 of the server. For example, in some embodiments, the server program can cause the one or more processors 202 to retrieve any data about any of the one or more vulnerabilities from any suitable data source or data repository, store any data about any of the one or more vulnerabilities in any suitable files with associated information, send the data about any of the one or more vulnerabilities to the one or more user devices 106 in response to receiving, from the one or more user devices 106, one or more requests for the data about any of the one or more vulnerabilities, any other suitable process disclosed herein, or any combination thereof.

In some embodiments, one or more processors 202 of any user device (e.g., 108, 110, 112 in FIG. 1) of the one or more user devices 106 can be controlled by a computer program stored in memory 204 of the user device. For example, the computer program can cause the one or more processors 202 to retrieve any data about any of the one or more vulnerabilities from any suitable data source or data repository, store any data about any of the one or more vulnerabilities in any suitable files with associated information, receive the data about any of the one or more vulnerabilities from the one or more servers 102 in response to sending, to the one or more servers 102, one or more requests for the data about any of the one or more vulnerabilities, any other suitable process disclosed herein, or any combination thereof.

In some embodiments, the memory 204 can include any suitable memory, storage, or a combination thereof for storing programs, data, and/or any other suitable information. For example, memory 204 can include volatile memory, non-volatile memory, or any combination thereof. In some embodiments, memory 204 can include random access memory, read-only memory, flash memory, a hard disk drive, a solid state drive, optical media, any other suitable memory, or any combination thereof. In some embodiments, the memory 204 can include a transitory computer-readable medium or a non-transitory computer-readable medium that may have stored thereon machine-readable instructions executable by the one or more processors 202. Examples of the non-transitory computer readable medium may include an electronic, magnetic, optical, or other physical storage device that contains or stores executable instructions. For example, the non-transitory computer readable medium may be a Random-Access memory (RAM), an Electrically Erasable Programmable Read-Only Memory (EEPROM), a hard disk, an optical disc, or other type of storage device.

In some embodiments, the device controller 206 can include any suitable processor or circuitry for controlling and receiving any input from the one or more input devices 208. In some embodiments, the one or more input devices 208 can include a touchscreen, a keyboard, a mouse, one or more buttons, a voice recognition circuit, a camera, one or more sensors, a global positioning system (GPS) receiver, any other suitable input device, or any combination thereof. In some embodiments, the one or more sensors can include one or more accelerometers, one or more gyroscope sensors, one or more microphones, any other suitable sensors (e.g., an optical sensor, a temperature sensor, a near field sensor), or any combination thereof.

In some embodiments, the display and/or audio drivers 210 can include any suitable circuitry for controlling and driving output to one or more display and/or audio output devices 212. For example, the output devices can include a display (e.g., including a touchscreen, a flat-panel display, a cathode ray tube display, a projector, any other suitable display or presentation device, or any combination thereof), one or more speakers, or a combination thereof.

In some embodiments, the one or more communication interfaces 214 can include any suitable circuitry for interfacing with one or more communication networks, such as network 104 as shown in FIG. 1. For example, the one or more communication interfaces 214 can include network interface card circuitry, wired communication circuitry, wireless communication circuitry, any other suitable communication network circuitry, or any combination thereof.

In some embodiments, the one or more antennas 216 can wirelessly communicate with a communication network (e.g., network 104). In some embodiments, the one or more antennas 216 can be omitted.

In some embodiments, the bus 218 can include any suitable communication system for communicating data, addresses, control signals, power, or any combination thereof, between two or more components 202, 204, 206, 210, and 214. In some embodiments, the bus 218 can include any suitable conductors that are constructed and arranged to communicate data, addresses, control signals, power, or any combination thereof, between two or more components 202, 204, 206, 210, and 214.

In some embodiments, any other suitable component(s) can be included in the computing device 200.

Figure 3:
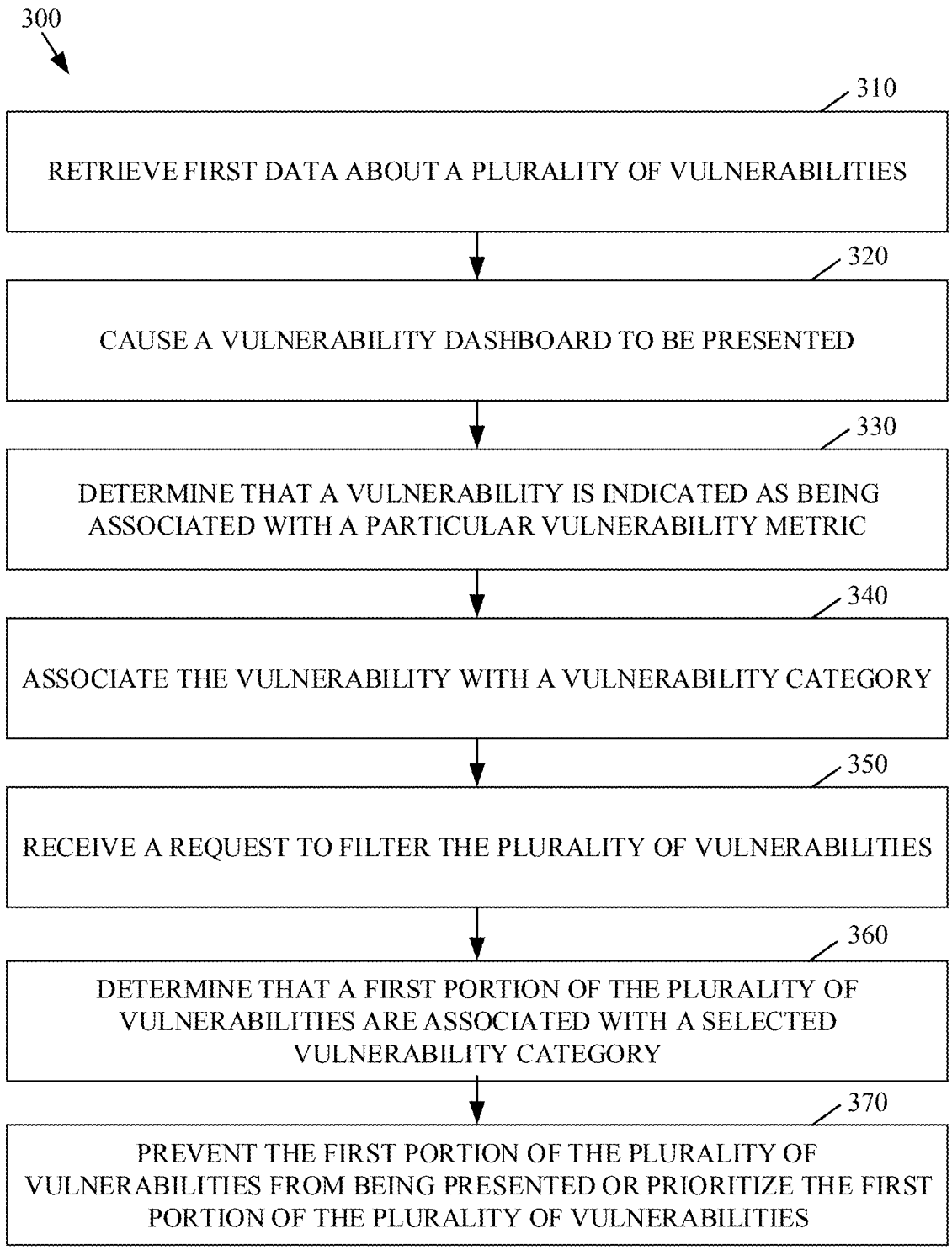
FIG. 3 illustrates a flow diagram of a process for managing vulnerability risks, according to some embodiments disclosed herein.

Referring to FIG. 3, a flow diagram of a process 300 for managing vulnerability risks is shown. In some embodiments, a system such as system 100 in FIG. 1 can be configured to perform the process 300. For example, any of the one or more servers 102 of the system 100, any of the one or more user devices 106, or any combination thereof, can be configured to perform the process 300.

In some embodiments, the process 300 can retrieve data about a plurality of vulnerabilities. In some embodiments, the process 300 can retrieve 310 data about the plurality of vulnerabilities from a publicly available data source or data repository (e.g., data source or data repository 120 in FIG. 1).

In some embodiments, the process 300 can cause 320 a vulnerability management dashboard to be presented, the vulnerability management dashboard identifying the plurality of vulnerabilities. For example, referring to FIG. 4, the process 300 can cause a vulnerability management dashboard 400 to be presented at a user device. As shown, the vulnerability management dashboard 400 can identify a plurality of vulnerabilities 410. While only ten vulnerabilities are identified in the dashboard 400, the dashboard can identify any suitable number of vulnerabilities. The dashboard 400 can include any data about the plurality of vulnerabilities 410. For example, the dashboard 400 can indicate, for each vulnerability, whether the vulnerability requires privileges to be exploited, an attack vector through which the vulnerability is exploitable, attack requirements, the user interaction required to exploit the vulnerability, the impact to the availability to elements or components in a system, an exploit maturity, an attack complexity, and a risk score based on any data retrieved from a publicly availably data source or data repository.

Turning back to FIG. 3, in some embodiments, the process 300 can determine 330 that a first vulnerability of the plurality of vulnerabilities is indicated as being associated with a particular metric such as, for example, a high level of privileges required to exploit the first vulnerability. For example, referring to FIG. 4, the dashboard 400 can indicate that at least vulnerabilities 1, 6, 7, and 10 require a high level of privileges to be exploited by including "High (H)" under the column labelled "Privileges Required."

Turning back to FIG. 3, in some embodiments, the process 300 can associate 340 the first vulnerability with a first vulnerability category based at least on the determination that the first vulnerability of the plurality of vulnerabilities is indicated as requiring a high level of privileges to be exploited. For example, referring to FIG. 4, the vulnerabilities 1, 6, 7, and 10 can be associated with "Category 3" under the column labelled "Category."

In some embodiments, the process 300 can receive 350 a request to filter the plurality of vulnerabilities based at least on the first vulnerability category. For example, referring to FIG. 4, the dashboard 400 can allow a user to prioritize or deprioritize vulnerabilities based on a selected category, via dropdown menus 420 and 430. Upon selecting a category to deprioritize such as "Category 3", the user's user device can receive a request to filter the plurality of vulnerabilities based at least on the selected category.

Figure 5:
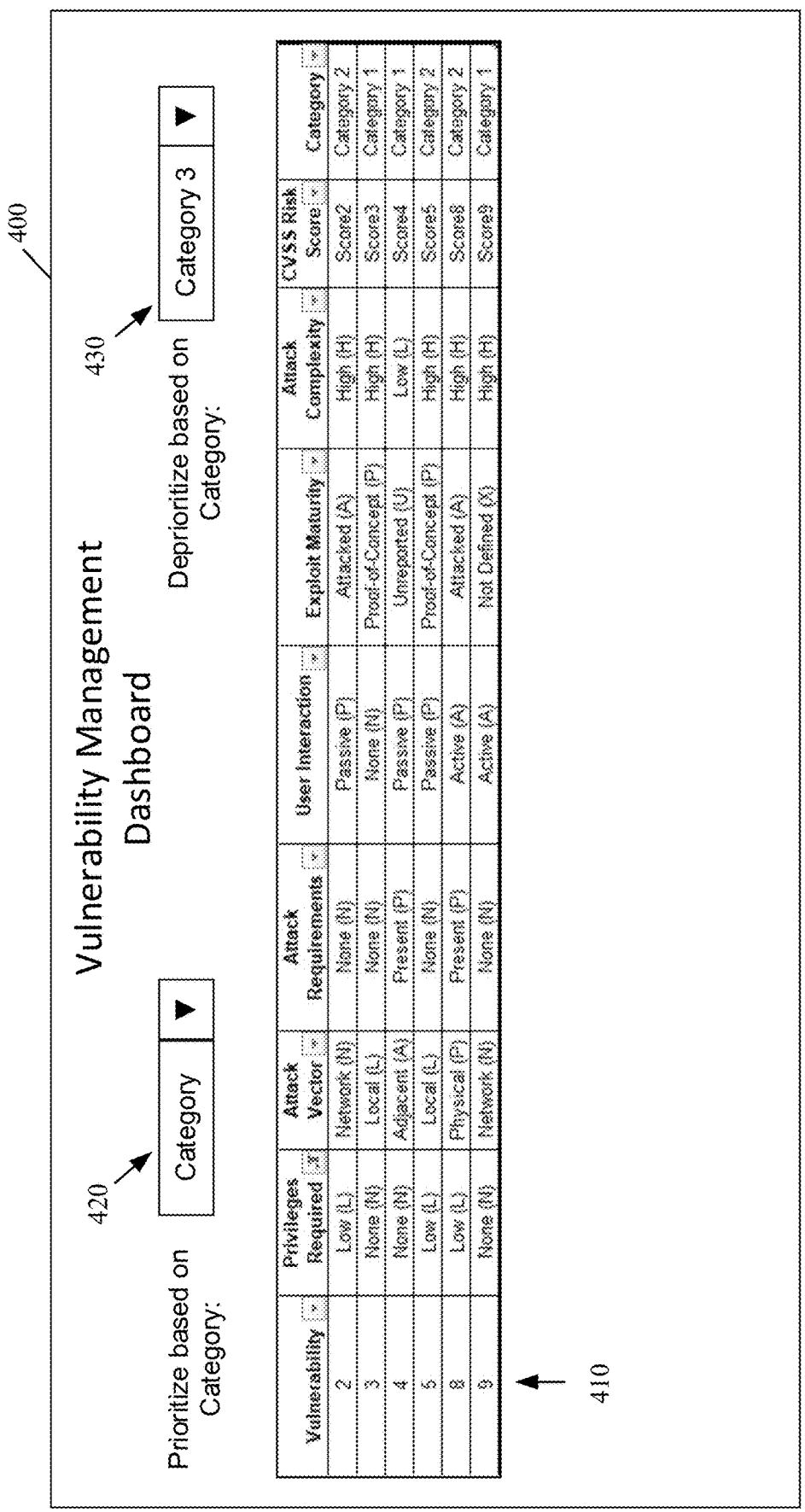

Turning back to FIG. 3, the process 300 can, in response to receiving the request to filter the plurality of vulnerabilities based at least on the first vulnerability category, determine 360 that a first portion of the plurality of vulnerabilities are associated with the first vulnerability category. In some embodiments, the process 300 can prevent 370 the first portion of the plurality of vulnerabilities from being presented in the dashboard. For example, referring to FIG. 5, in response to receiving a request to filter the plurality of vulnerabilities based on the selected category "Category 3", the dashboard 400 can prevent the vulnerabilities categorized as "Category 3" from being presented.

Turning back to FIG. 3, in some embodiments, the process 300 can determine 330 that another vulnerability of the plurality of vulnerabilities is indicated as being associated with a particular metric such as, for example, a low level of privileges required to exploit the vulnerability. For example, referring to FIG. 4, the dashboard 400 can indicate that at least vulnerabilities 2, 5, 8 require a low level of privileges to be exploited by including "Low (L)" under the column labelled "Privileges Required."

Turning back to FIG. 3, in some embodiments, the process 300 can associate 340 the vulnerability with a second vulnerability category based at least on the determination that the vulnerability of the plurality of vulnerabilities is indicated as requiring a low level of privileges to be exploited. For example, referring to FIG. 4, the vulnerabilities 2, 5, 8 can be associated with "Category 2" under the column labelled "Category."

Turning back to FIG. 3, the process 300 can receive 350 a request to filter the plurality of vulnerabilities based at least on the second vulnerability category (e.g., "Category 2"). For example, referring to FIG. 4, upon selecting a category to deprioritize such as "Category 2", the user's user device can receive a request to filter the plurality of vulnerabilities based at least on "Category 2".

Figure 6:
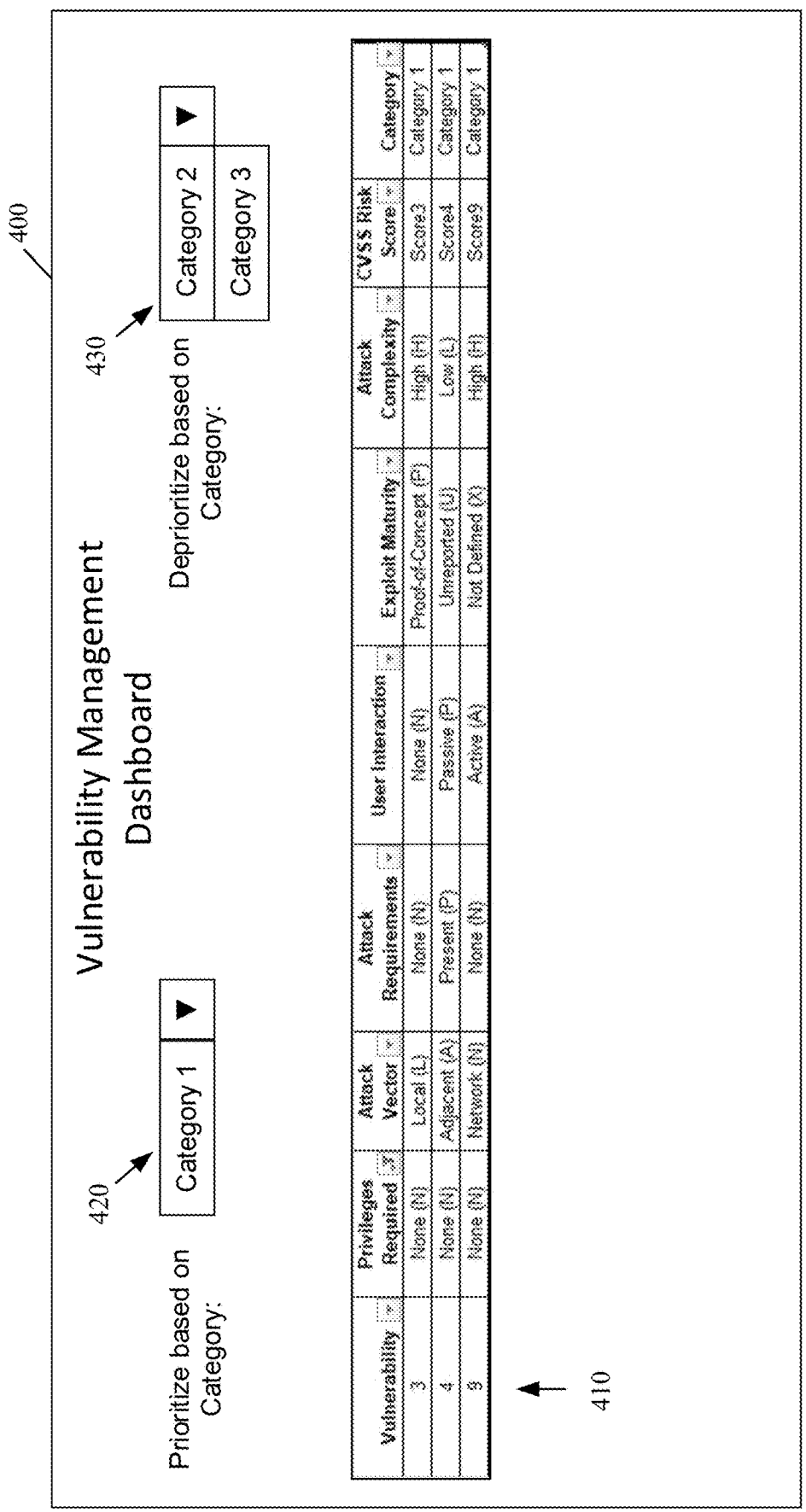

Turning back to FIG. 3, the process 300 can, in response to receiving the request to filter the plurality of vulnerabilities based at least on the second vulnerability category, determine 360 that a second portion of the plurality of vulnerabilities are associated with the second vulnerability category. In some embodiments, the process 300 can prevent 370 the second portion of the plurality of vulnerabilities from being presented in the dashboard. For example, referring to FIG. 6, in response to receiving a request to filter the plurality of vulnerabilities based on the selected category "Category 2", the dashboard 400 can prevent the vulnerabilities categorized as "Category 2" from being presented.

Turning back to FIG. 3, in some embodiments, the process 300 can determine 330 that another vulnerability of the plurality of vulnerabilities is indicated as being associated with a particular metric such as, for example, a zero level of privileges (i.e., no privileges) required to exploit the vulnerability. For example, referring to FIG. 4, the dashboard 400 can indicate that at least vulnerabilities 3, 4, 9 require a zero level of privileges to be exploited by including "None (N)" under the column labelled "Privileges Required."

Turning back to FIG. 3, in some embodiments, the process 300 can associate 340 the vulnerability with a third vulnerability category based at least on the determination that the vulnerability of the plurality of vulnerabilities is indicated as requiring a zero level of privileges to be exploited. For example, referring to FIG. 4, the vulnerabilities 3, 4, 9 can be associated with "Category 1" under the column labelled "Category."

Turning back to FIG. 3, the process 300 can receive 350 a request to filter the plurality of vulnerabilities based at least on the third vulnerability category (e.g., "Category 1"). For example, referring to FIG. 4, upon selecting a category to prioritize such as "Category 1", the user's user device can receive a request to filter the plurality of vulnerabilities based at least on "Category 1".

Turning back to FIG. 3, the process 300 can, in response to receiving the request to filter the plurality of vulnerabilities based at least on the third vulnerability category, determine 360 that a third portion of the plurality of vulnerabilities are associated with the third vulnerability category. In some embodiments, the process 300 can prioritize 370 the third portion of the plurality of vulnerabilities in the dashboard. For example, referring to FIG. 6, in response to receiving a request to filter the plurality of vulnerabilities based on the selected category "Category 1", the dashboard 400 can cause only the vulnerabilities categorized as "Category 1" to be presented while causing other vulnerabilities not to be presented.

Turning back to FIG. 3, in some embodiments, the process 300 can determine 330 that another vulnerability of the plurality of vulnerabilities is indicated as being associated with a particular metric such as, for example, a physical attack vector. For example, referring to FIG. 4, the dashboard 400 can indicate that vulnerability 8 is exploitable through a physical attack vector by including "Physical (P)" under the column name "Attack Vector."

Turning back to FIG. 3, in some embodiments, the process 300 can associate 340 the vulnerability with a fourth vulnerability category based at least on the determination that the vulnerability is indicated as being exploitable through the physical attack vector. The process 300 can receive a request to filter the plurality of vulnerabilities based at least on the fourth vulnerability category (e.g., "Category 4"). Upon selecting a category to deprioritize such as "Category 4", the user's user device can receive a request to filter the plurality of vulnerabilities based at least on "Category 4".

Figure 7:
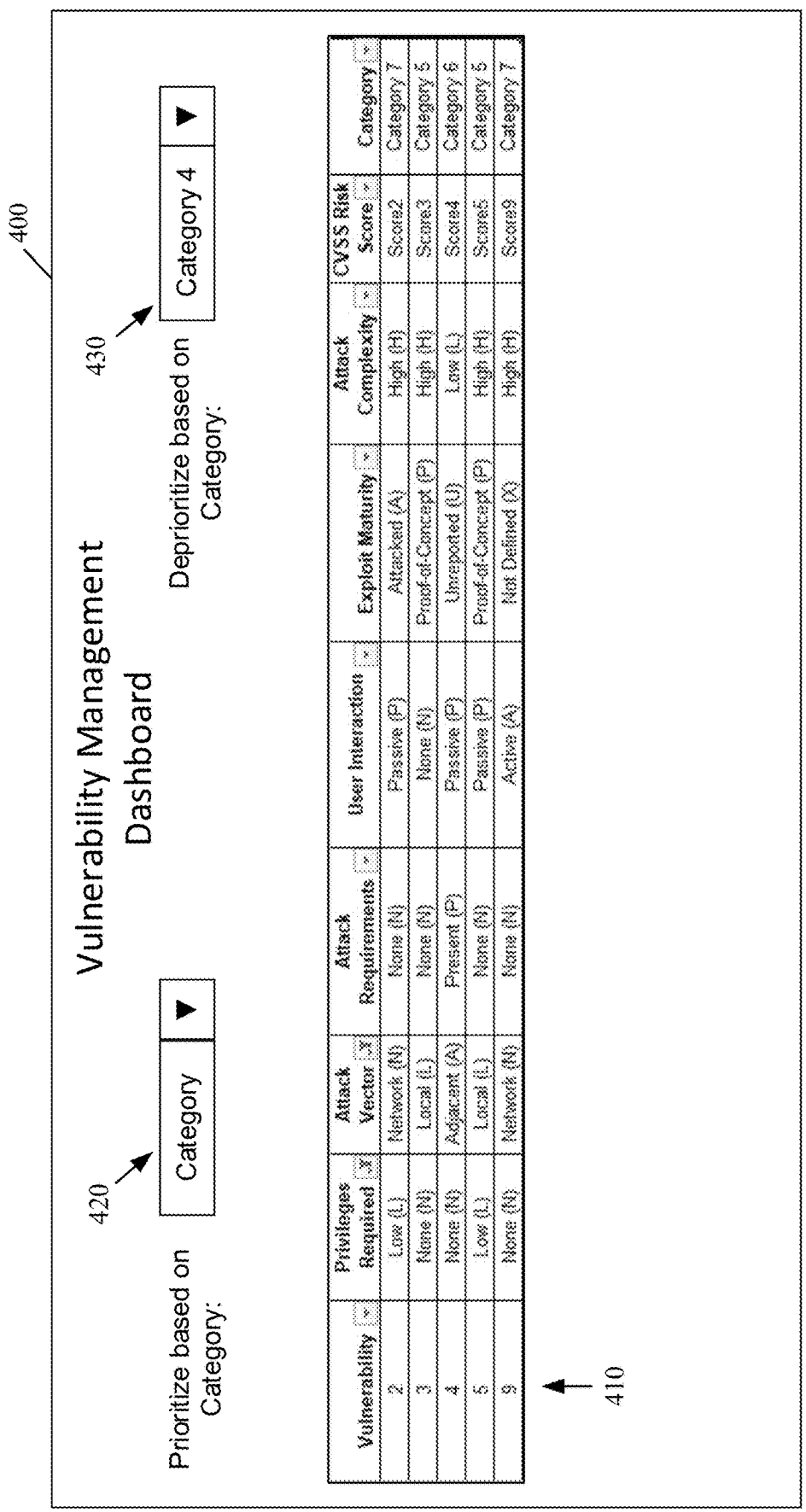

The process 300 can, in response to receiving 350 the request to filter the plurality of vulnerabilities based at least on the fourth vulnerability category, determine 360 that a fourth portion of the plurality of vulnerabilities are associated with the fourth vulnerability category. In some embodiments, the process 300 can prevent 370 the fourth portion of the plurality of vulnerabilities from being presented in the dashboard. For example, referring to FIG. 7, in response to receiving a request to filter the plurality of vulnerabilities based on the selected category "Category 4", the dashboard 400 can prevent the vulnerability categorized as "Category 4" from being presented.

Turning back to FIG. 3, in some embodiments, the process 300 can determine 330 that another vulnerability of the plurality of vulnerabilities is indicated as being associated with a particular metric such as, for example, a local attack vector. For example, referring to FIG. 4, the dashboard 400 can indicate that vulnerabilities 3, 5, 10 are exploitable through a local attack vector by including "Local (L)" under the column name "Attack Vector."

Turning back to FIG. 3, in some embodiments, the process 300 can associate 340 the vulnerability with a fifth vulnerability category based at least on the determination that the vulnerability is indicated as being exploitable through the local attack vector. The process 300 can receive 350 a request to filter the plurality of vulnerabilities based at least on the fifth vulnerability category (e.g., "Category 5"). Upon selecting a category to deprioritize such as "Category 5", the user's user device can receive a request to filter the plurality of vulnerabilities based at least on "Category 5".

Figure 8:
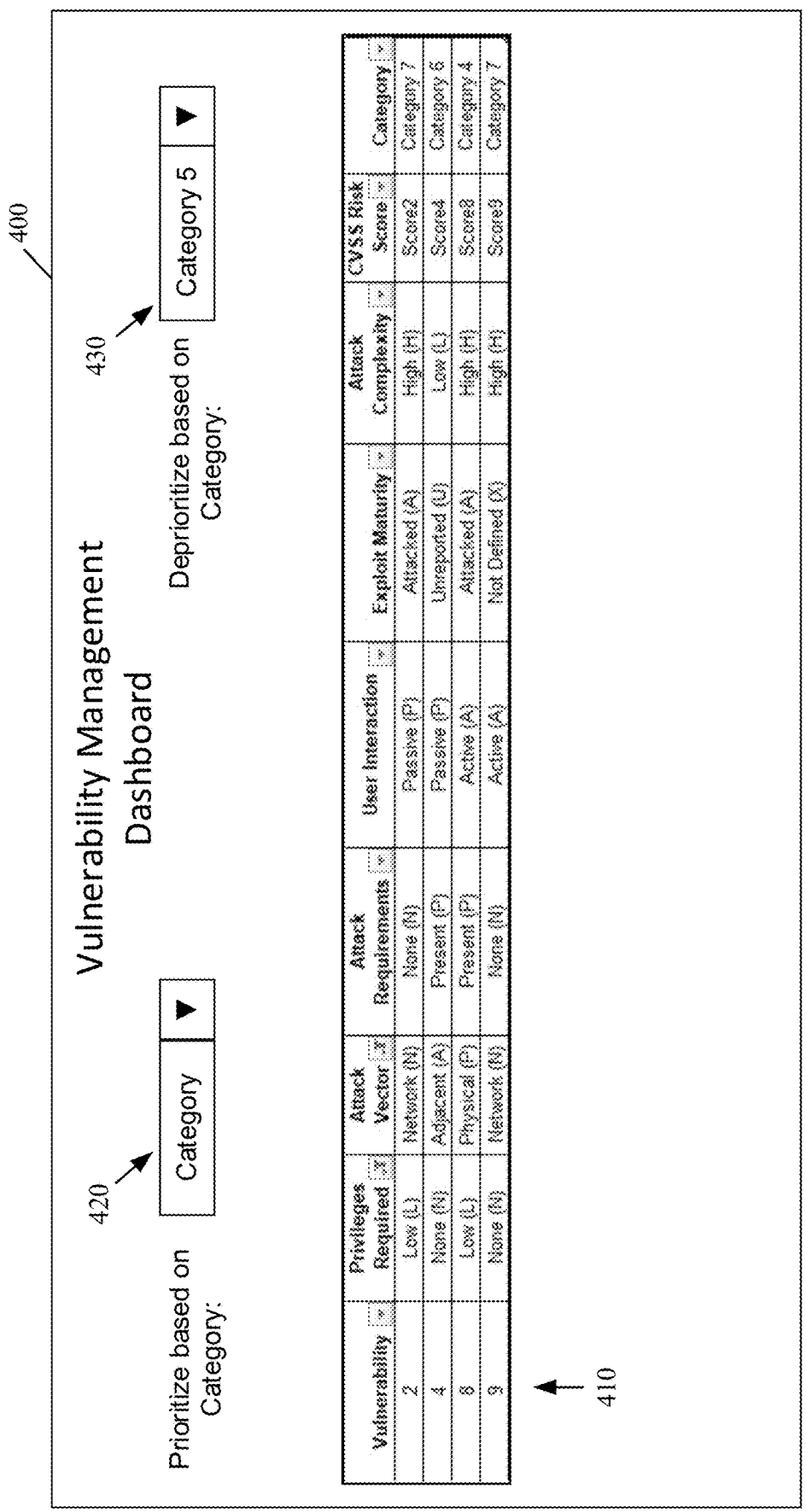

The process 300 can, in response to receiving the request to filter the plurality of vulnerabilities based at least on the fifth vulnerability category, determine 360 that a fifth portion of the plurality of vulnerabilities are associated with the fifth vulnerability category. In some embodiments, the process 300 can prevent 370 the fifth portion of the plurality of vulnerabilities from being presented in the dashboard. For example, referring to FIG. 8, in response to receiving a request to filter the plurality of vulnerabilities based on the selected category "Category 5", the dashboard 400 can prevent the vulnerabilities categorized as "Category 5" from being presented.

Turning back to FIG. 3, in some embodiments, the process 300 can determine 330 that another vulnerability of the plurality of vulnerabilities is indicated as being associated with a particular metric such as, for example, an adjacent attack vector. For example, referring to FIG. 4, the dashboard 400 can indicate that vulnerabilities 1, 4, 6 are exploitable through a local attack vector by including "Adjacent (A)" under the column name "Attack Vector."

Turning back to FIG. 3, in some embodiments, the process 300 can associate 340 the vulnerability with a sixth vulnerability category based at least on the determination that the vulnerability is indicated as being exploitable through the adjacent attack vector. The process 300 can receive 350 a request to filter the plurality of vulnerabilities based at least on the sixth vulnerability category (e.g., "Category 6"). Upon selecting a category to deprioritize such as "Category 6", the user's user device can receive a request to filter the plurality of vulnerabilities based at least on "Category 6".

Figure 9:
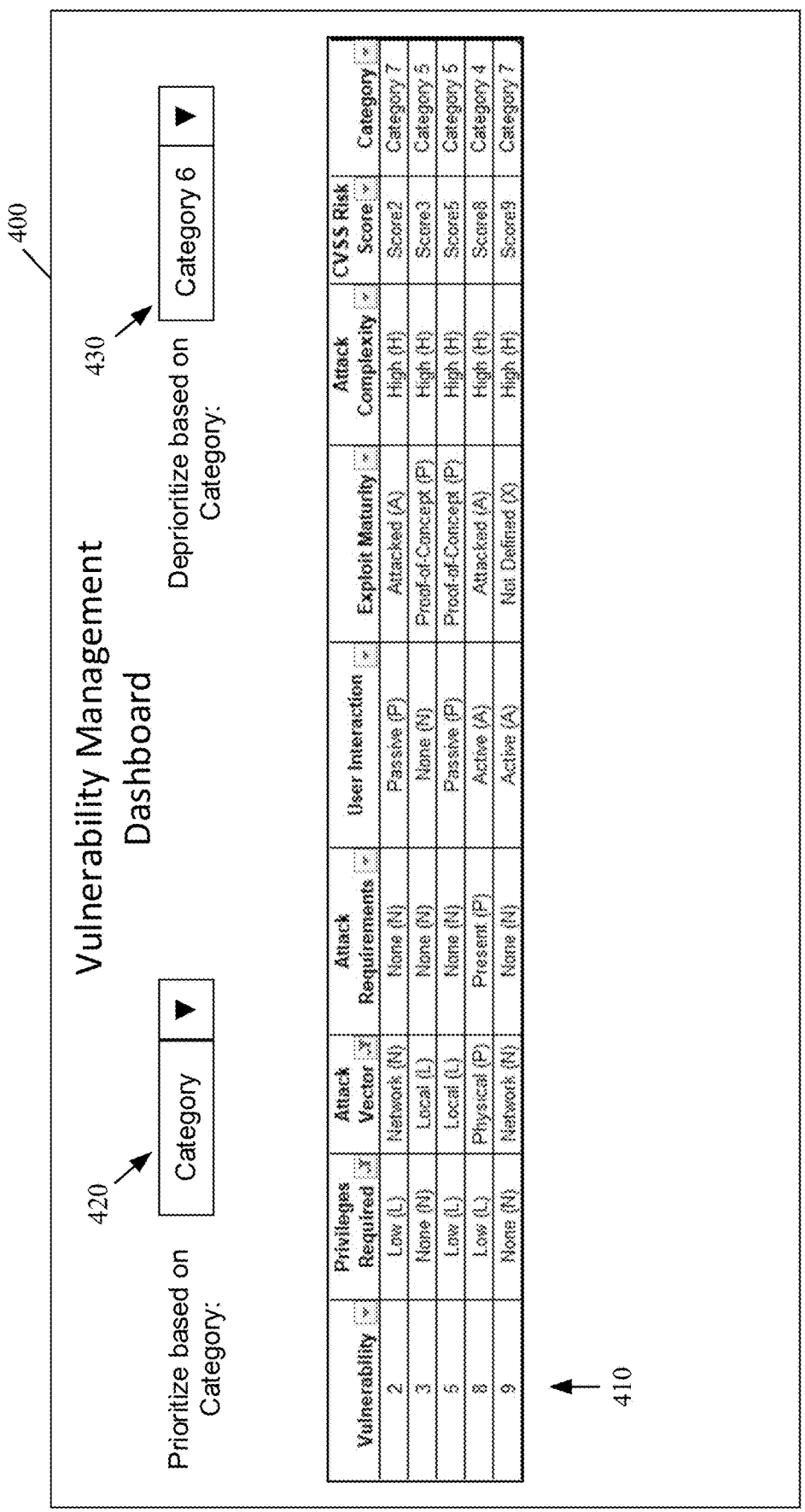

The process 300 can, in response to receiving 350 the request to filter the plurality of vulnerabilities based at least on the sixth vulnerability category, determine 360 that a sixth portion of the plurality of vulnerabilities are associated with the sixth vulnerability category. In some embodiments, the process 300 can prevent 370 the sixth portion of the plurality of vulnerabilities from being presented in the dashboard. For example, referring to FIG. 9, in response to receiving a request to filter the plurality of vulnerabilities based on the selected category "Category 6", the dashboard 400 can prevent the vulnerabilities categorized as "Category 6" from being presented.

Turning back to FIG. 3, in some embodiments, the process 300 can determine 330 that another vulnerability of the plurality of vulnerabilities is indicated as being associated with a particular metric such as, for example, a network attack vector. For example, referring to FIG. 4, the dashboard 400 can indicate that vulnerabilities 2, 7, 9 are exploitable through a local attack vector by including "Network (N)" under the column name "Attack Vector."

Turning back to FIG. 3, in some embodiments, the process 300 can associate 340 the vulnerability with a seventh vulnerability category (e.g., "Category 7") based at least on the determination that the vulnerability is indicated as being exploitable through the network attack vector. The process 300 can receive a request to filter the plurality of vulnerabilities based at least on the seventh vulnerability category. Upon selecting a category to prioritize such as "Category 7", the user's user device can receive a request to filter the plurality of vulnerabilities based at least on "Category 7".

Figure 10:
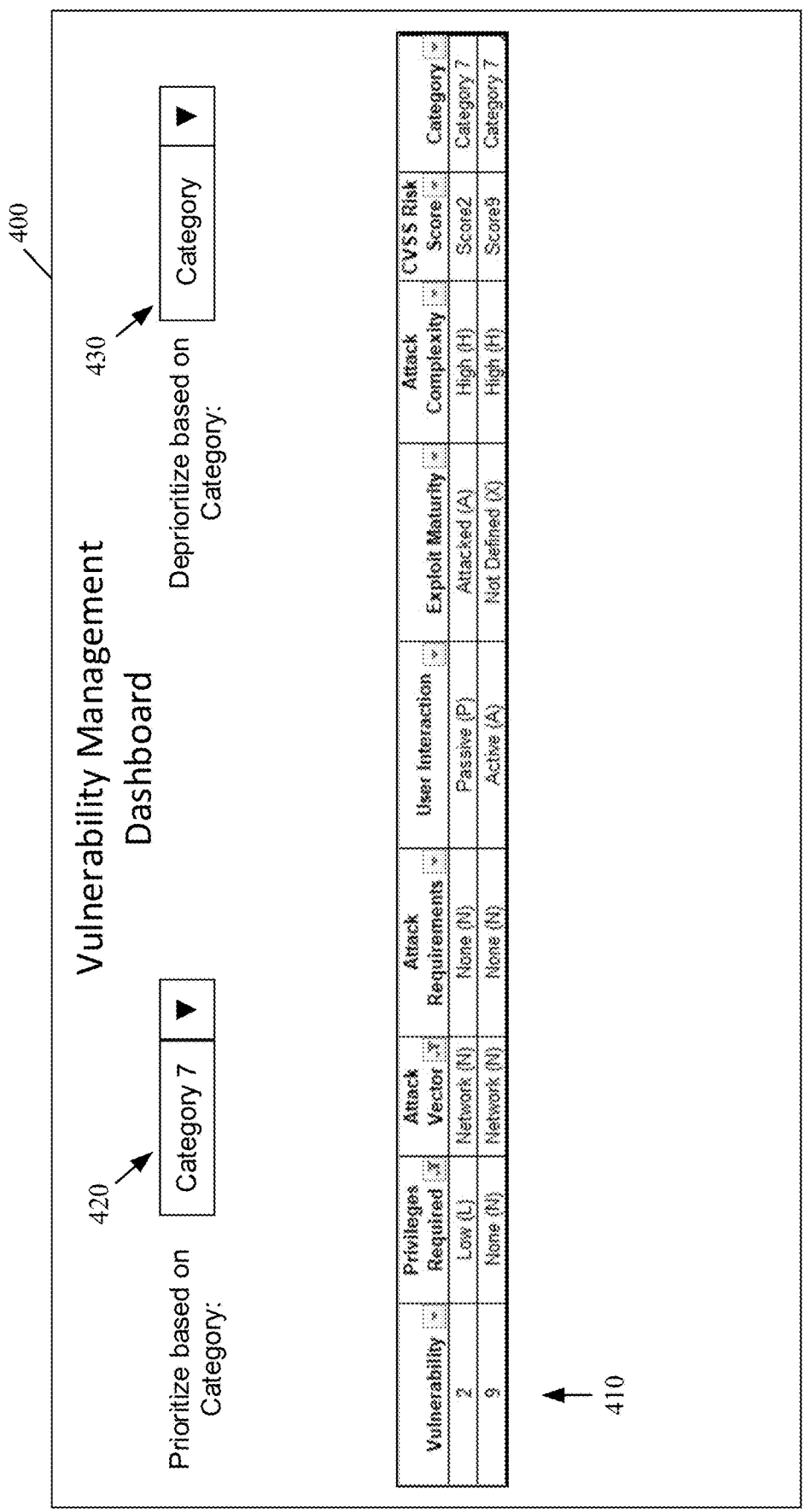

The process 300 can, in response to receiving the request to filter the plurality of vulnerabilities based at least on the seventh vulnerability category, determine that a seventh portion of the plurality of vulnerabilities are associated with the seventh vulnerability category. In some embodiments, the process 300 can prioritize 370 the seventh portion of the plurality of vulnerabilities in the dashboard. For example, referring to FIG. 10, in response to receiving a request to filter the plurality of vulnerabilities based on the selected category "Category 7", the dashboard 400 can cause only the vulnerabilities categorized as "Category 7" to be presented while preventing other vulnerabilities from being presented.

In some embodiments, the process 300 can filter the plurality of vulnerabilities based on any metric associated with a vulnerability as indicated in CVE data such as, for example, attack requirements to exploit the vulnerability, the user interaction required to exploit the vulnerability, the impact to the availability to elements or components in a system if the vulnerability was exploited, an exploit maturity, an attack complexity required to exploit the vulnerability, a vulnerability risk score, or any combination thereof.

Figure 4:
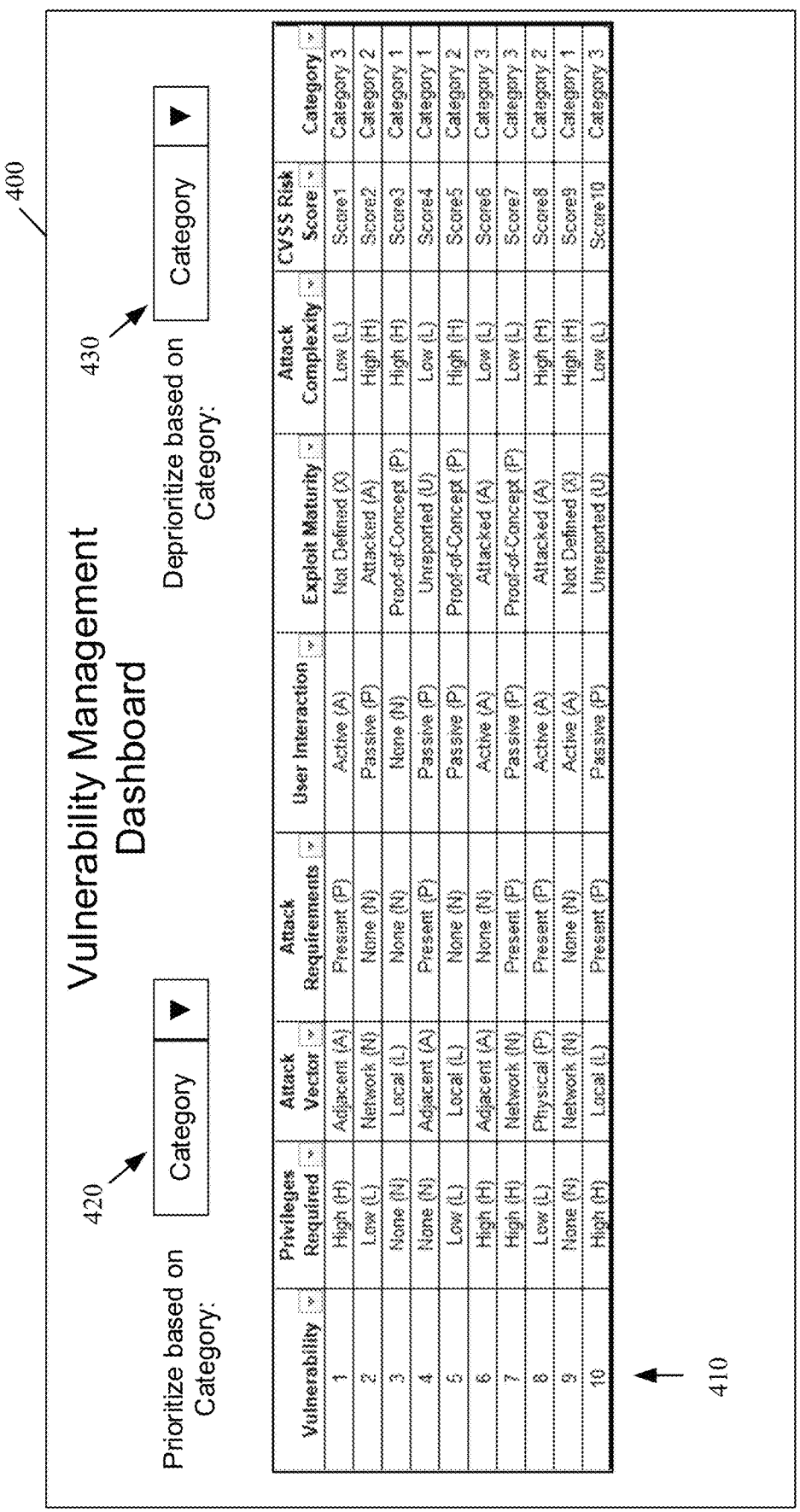
FIGS. 4-10 illustrate a vulnerability management dashboard for managing vulnerability risks, according to some embodiments disclosed herein.

The owner of this patent reserves the right for each client of this patent to prioritize each CVE based on these contextual groupings of CVEs as outlined in FIG. 4.

According to some embodiments, a system for managing vulnerability risks, can include: memory; and one or more processors coupled to the memory and configured at least to: receive first data about a plurality of vulnerabilities; cause a vulnerability management dashboard to be presented, the vulnerability management dashboard identifying the plurality of vulnerabilities; determine that a first vulnerability of the plurality of vulnerabilities is indicated as requiring a high level of privileges to be exploited based at least on the first data about the plurality of vulnerabilities; associate the first vulnerability with a first vulnerability category based at least on the determination that the first vulnerability of the plurality of vulnerabilities is indicated as requiring a high level of privileges to be exploited; receive a request to filter the plurality of vulnerabilities based at least on the first vulnerability category; in response to receiving the request to filter the plurality of vulnerabilities based at least on the first vulnerability category, determine that a first portion of the plurality of vulnerabilities are associated with the first vulnerability category; and prevent the first portion of the plurality of vulnerabilities from being presented in the vulnerability management dashboard.

In some embodiments, the one or more processors are further configured to: determine that a second vulnerability of the plurality of vulnerabilities is indicated as requiring a low level of privileges to be exploited based at least on the first data about the plurality of vulnerabilities; associate the second vulnerability with a second vulnerability category based at least on the determination that the second vulnerability of the plurality of vulnerabilities is indicated as requiring a low level of privileges to be exploited; receive a second request to filter the plurality of vulnerabilities based at least on the second vulnerability category; in response to receiving the second request to filter the plurality of vulnerabilities based at least on the second vulnerability category, determine that a second portion of the plurality of vulnerabilities are associated with the second vulnerability category; and prevent the second portion of the plurality of vulnerabilities from being presented in the vulnerability management dashboard.

In some embodiments, the one or more processors are further configured to: determine that a second vulnerability of the plurality of vulnerabilities is indicated as requiring no privileges to be exploited based at least on the first data about the plurality of vulnerabilities; associate the second vulnerability with a second vulnerability category based at least on the determination that the second vulnerability of the plurality of vulnerabilities is indicated as requiring no privileges to be exploited; receive a second request to filter the plurality of vulnerabilities based at least on the second vulnerability category; in response to receiving the second request to filter the plurality of vulnerabilities based at least on the second vulnerability category, determine that a second portion of the plurality of vulnerabilities are associated with the second vulnerability category; and prioritize the second portion of the plurality of vulnerabilities in the vulnerability management dashboard.

In some embodiments, the one or more processors are further configured to: determine that a first attack vector through which a second vulnerability of the plurality of vulnerabilities is exploitable is indicated as a physical attack vector based at least on the first data about the plurality of vulnerabilities; associate the second vulnerability with a second vulnerability category based at least on the determination that the first attack vector through which the second vulnerability is exploitable is indicated as the physical attack vector; receive a second request to filter the plurality of vulnerabilities based at least on the second vulnerability category; in response to receiving the second request to filter the plurality of vulnerabilities based at least on the second vulnerability category, determine that a second portion of the plurality of vulnerabilities are associated with the second vulnerability category; and prevent the second portion of the plurality of vulnerabilities from being presented in the vulnerability management dashboard.

In some embodiments, the one or more processors are further configured to: determine that a first attack vector through which a second vulnerability of the plurality of vulnerabilities is exploitable is indicated as a local attack vector based at least on the first data about the plurality of vulnerabilities; associate the second vulnerability with a second vulnerability category based at least on the determination that the first attack vector through which the second vulnerability is exploitable is indicated as the local attack vector; receive a second request to filter the plurality of vulnerabilities based at least on the second vulnerability category; in response to receiving the second request to filter the plurality of vulnerabilities based at least on the second vulnerability category, determine that a second portion of the plurality of vulnerabilities are associated with the second vulnerability category; and prevent the second portion of the plurality of vulnerabilities from being presented in the vulnerability management dashboard.

In some embodiments, the one or more processors are further configured to: determine that a first attack vector through which a second vulnerability of the plurality of vulnerabilities is exploitable is indicated as an adjacent attack vector based at least on the first data about the plurality of vulnerabilities; associate the second vulnerability with a second vulnerability category based at least on the determination that the first attack vector through which the second vulnerability is exploitable is indicated as the adjacent attack vector; receive a second request to filter the plurality of vulnerabilities based at least on the second vulnerability category; in response to receiving the second request to filter the plurality of vulnerabilities based at least on the second vulnerability category, determine that a second portion of the plurality of vulnerabilities are associated with the second vulnerability category; and prevent the second portion of the plurality of vulnerabilities from being presented in the vulnerability management dashboard.

In some embodiments, the one or more processors are further configured to: determine that a first attack vector through which a second vulnerability of the plurality of vulnerabilities is exploitable is indicated as a network attack vector based at least on the first data about the plurality of vulnerabilities; associate the second vulnerability with a second vulnerability category based at least on the determination that the first attack vector through which the second vulnerability is exploitable is indicated as the network attack vector; receive a second request to filter the plurality of vulnerabilities based at least on the second vulnerability category; in response to receiving the second request to filter the plurality of vulnerabilities based at least on the second vulnerability category, determine that a second portion of the plurality of vulnerabilities are associated with the second vulnerability category; and prioritize the second portion of the plurality of vulnerabilities from being presented in the vulnerability management dashboard.

In some embodiments, a method for managing vulnerability risks can include: receiving first data about a plurality of vulnerabilities; causing a vulnerability management dashboard to be presented, the vulnerability management dashboard identifying the plurality of vulnerabilities; determining that a first vulnerability of the plurality of vulnerabilities is indicated as requiring a high level of privileges to be exploited based at least on the first data about the plurality of vulnerabilities; associating the first vulnerability with a first vulnerability category based at least on the determination that the first vulnerability of the plurality of vulnerabilities is indicated as requiring a high level of privileges to be exploited; receiving a request to filter the plurality of vulnerabilities based at least on the first vulnerability category; in response to receiving the request to filter the plurality of vulnerabilities based at least on the first vulnerability category, determining that a first portion of the plurality of vulnerabilities are associated with the first vulnerability category; and preventing the first portion of the plurality of vulnerabilities from being presented in the vulnerability management dashboard.

In some embodiments, the method can further comprise: determining that a second vulnerability of the plurality of vulnerabilities is indicated as requiring a low level of privileges to be exploited based at least on the first data about the plurality of vulnerabilities; associating the second vulnerability with a second vulnerability category based at least on the determination that the second vulnerability of the plurality of vulnerabilities is indicated as requiring a low level of privileges to be exploited; receiving a second request to filter the plurality of vulnerabilities based at least on the second vulnerability category; in response to receiving the second request to filter the plurality of vulnerabilities based at least on the second vulnerability category, determining that a second portion of the plurality of vulnerabilities are associated with the second vulnerability category; and preventing the second portion of the plurality of vulnerabilities from being presented in the vulnerability management dashboard.

In some embodiments, the method can further comprise: determining that a second vulnerability of the plurality of vulnerabilities is indicated as requiring no privileges to be exploited based at least on the first data about the plurality of vulnerabilities; associating the second vulnerability with a second vulnerability category based at least on the determination that the second vulnerability of the plurality of vulnerabilities is indicated as requiring no privileges to be exploited; receiving a second request to filter the plurality of vulnerabilities based at least on the second vulnerability category; in response to receiving the second request to filter the plurality of vulnerabilities based at least on the second vulnerability category, determining that a second portion of the plurality of vulnerabilities are associated with the second vulnerability category; and prioritizing the second portion of the plurality of vulnerabilities in the vulnerability management dashboard.

In some embodiments, the method can further comprise: determining that a first attack vector through which a second vulnerability of the plurality of vulnerabilities is exploitable is indicated as a physical attack vector based at least on the first data about the plurality of vulnerabilities; associating the second vulnerability with a second vulnerability category based at least on the determination that the first attack vector through which the second vulnerability is exploitable is indicated as the physical attack vector; receiving a second request to filter the plurality of vulnerabilities based at least on the second vulnerability category; in response to receiving the second request to filter the plurality of vulnerabilities based at least on the second vulnerability category, determining that a second portion of the plurality of vulnerabilities are associated with the second vulnerability category; and preventing the second portion of the plurality of vulnerabilities from being presented in the vulnerability management dashboard.

In some embodiments, the method can further comprise: determining that a first attack vector through which a second vulnerability of the plurality of vulnerabilities is exploitable is indicated as a local attack vector based at least on the first data about the plurality of vulnerabilities; associating the second vulnerability with a second vulnerability category based at least on the determination that the first attack vector through which the second vulnerability is exploitable is indicated as the local attack vector; receiving a second request to filter the plurality of vulnerabilities based at least on the second vulnerability category; in response to receiving the second request to filter the plurality of vulnerabilities based at least on the second vulnerability category, determining that a second portion of the plurality of vulnerabilities are associated with the second vulnerability category; and preventing the second portion of the plurality of vulnerabilities from being presented in the vulnerability management dashboard.

In some embodiments, the method can further comprise: determining that a first attack vector through which a second vulnerability of the plurality of vulnerabilities is exploitable is indicated as an adjacent attack vector based at least on the first data about the plurality of vulnerabilities; associating the second vulnerability with a second vulnerability category based at least on the determination that the first attack vector through which the second vulnerability is exploitable is indicated as the adjacent attack vector; receiving a second request to filter the plurality of vulnerabilities based at least on the second vulnerability category; in response to receiving the second request to filter the plurality of vulnerabilities based at least on the second vulnerability category, determining that a second portion of the plurality of vulnerabilities are associated with the second vulnerability category; and preventing the second portion of the plurality of vulnerabilities from being presented in the vulnerability management dashboard.

In some embodiments, the method can further comprise: determining that a first attack vector through which a second vulnerability of the plurality of vulnerabilities is exploitable is indicated as a network attack vector based at least on the first data about the plurality of vulnerabilities; associating the second vulnerability with a second vulnerability category based at least on the determination that the first attack vector through which the second vulnerability is exploitable is indicated as the network attack vector; receiving a second request to filter the plurality of vulnerabilities based at least on the second vulnerability category; in response to receiving the second request to filter the plurality of vulnerabilities based at least on the second vulnerability category, determining that a second portion of the plurality of vulnerabilities are associated with the second vulnerability category; and prioritizing the second portion of the plurality of vulnerabilities from being presented in the vulnerability management dashboard.

In some embodiments, the method can further comprise: determining that attack requirements for exploiting a second vulnerability of the plurality of vulnerabilities are indicated as being present based at least on the first data about the plurality of vulnerabilities; associating the second vulnerability with a second vulnerability category based at least on the determination that attack requirements for exploiting the second vulnerability are indicated as being present; determining that user interaction required to exploit a third vulnerability of the plurality of vulnerabilities is indicated as being active based at least on the first data about the plurality of vulnerabilities; associating the third vulnerability with a third vulnerability category based at least on the determination that the user interaction required to exploit the third vulnerability is indicated as being active; determining that an exploit maturity associated with a fourth vulnerability of the plurality of vulnerabilities is indicated as being unreported based at least on the first data about the plurality of vulnerabilities; associating the fourth vulnerability with a fourth vulnerability category based at least on the determination that the exploit maturity associated with the fourth vulnerability is indicated as being unreported; determining that an attack complexity required to exploit a fifth vulnerability of the plurality of vulnerabilities is indicated as being high based at least on the first data about the plurality of vulnerabilities; associating the fifth vulnerability with a fifth vulnerability category based at least on the determination that the attack complexity required to exploit the fifth vulnerability is indicated as being high.

In some embodiments, a non-transitory computer-readable medium can comprise instructions, that when executed by one or more processors, cause the one or more processors to perform any method disclosed herein. It will be understood that it would be unduly repetitious and obfuscating to describe and illustrate every reordering, combination and subcombination of the elements and the aspects described. Accordingly, all elements, processes, and subprocesses can be combined in any way and/or combination, and the present specification, including the drawings, shall be construed to constitute a complete written description of all reorderings, combinations and subcombinations of the elements, processes, and subprocesses and of the aspects described herein, and of the manner and process of making and using the elements, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for managing vulnerability risks, comprising:
   memory; and
   one or more processors coupled to the memory and configured at least to:
   receive first data about a plurality of vulnerabilities;
   cause a vulnerability management dashboard to be presented, the vulnerability management dashboard identifying the plurality of vulnerabilities;

determine that a first vulnerability of the plurality of vulnerabilities is indicated as requiring a high level of privileges to be exploited based at least on the first data about the plurality of vulnerabilities;

associate the first vulnerability with a first vulnerability category based at least on the determination that the first vulnerability of the plurality of vulnerabilities is indicated as requiring a high level of privileges to be exploited;

receive a request to filter the plurality of vulnerabilities based at least on the first vulnerability category;

in response to receiving the request to filter the plurality of vulnerabilities based at least on the first vulnerability category, determine that a first portion of the plurality of vulnerabilities are associated with the first vulnerability category; and prevent the first portion of the plurality of vulnerabilities from being presented in the vulnerability management dashboard.

2. The system of claim 1, wherein the one or more processors are further configured to:

determine that a second vulnerability of the plurality of vulnerabilities is indicated as requiring a low level of privileges to be exploited based at least on the first data about the plurality of vulnerabilities;

associate the second vulnerability with a second vulnerability category based at least on the determination that the second vulnerability of the plurality of vulnerabilities is indicated as requiring a low level of privileges to be exploited;

receive a second request to filter the plurality of vulnerabilities based at least on the second vulnerability category;

in response to receiving the second request to filter the plurality of vulnerabilities based at least on the second vulnerability category, determine that a second portion of the plurality of vulnerabilities are associated with the second vulnerability category; and prevent the second portion of the plurality of vulnerabilities from being presented in the vulnerability management dashboard.

3. The system of claim 1, wherein the one or more processors are further configured to:

determine that a second vulnerability of the plurality of vulnerabilities is indicated as requiring no privileges to be exploited based at least on the first data about the plurality of vulnerabilities;

associate the second vulnerability with a second vulnerability category based at least on the determination that the second vulnerability of the plurality of vulnerabilities is indicated as requiring no privileges to be exploited;

receive a second request to filter the plurality of vulnerabilities based at least on the second vulnerability category;

in response to receiving the second request to filter the plurality of vulnerabilities based at least on the second vulnerability category, determine that a second portion of the plurality of vulnerabilities are associated with the second vulnerability category; and prioritize the second portion of the plurality of vulnerabilities in the vulnerability management dashboard.

4. The system of claim 1, wherein the one or more processors are further configured to:

determine that a first attack vector through which a second vulnerability of the plurality of vulnerabilities is exploitable is indicated as a physical attack vector based at least on the first data about the plurality of vulnerabilities;

associate the second vulnerability with a second vulnerability category based at least on the determination that the first attack vector through which the second vulnerability is exploitable is indicated as the physical attack vector;

receive a second request to filter the plurality of vulnerabilities based at least on the second vulnerability category;

in response to receiving the second request to filter the plurality of vulnerabilities based at least on the second vulnerability category, determine that a second portion of the plurality of vulnerabilities are associated with the second vulnerability category; and prevent the second portion of the plurality of vulnerabilities from being presented in the vulnerability management dashboard.

5. The system of claim 1, wherein the one or more processors are further configured to:

determine that a first attack vector through which a second vulnerability of the plurality of vulnerabilities is exploitable is indicated as a local attack vector based at least on the first data about the plurality of vulnerabilities;

associate the second vulnerability with a second vulnerability category based at least on the determination that the first attack vector through which the second vulnerability is exploitable is indicated as the local attack vector;

receive a second request to filter the plurality of vulnerabilities based at least on the second vulnerability category;

in response to receiving the second request to filter the plurality of vulnerabilities based at least on the second vulnerability category, determine that a second portion of the plurality of vulnerabilities are associated with the second vulnerability category; and prevent the second portion of the plurality of vulnerabilities from being presented in the vulnerability management dashboard.

6. The system of claim 1, wherein the one or more processors are further configured to:

determine that a first attack vector through which a second vulnerability of the plurality of vulnerabilities is exploitable is indicated as an adjacent attack vector based at least on the first data about the plurality of vulnerabilities;

associate the second vulnerability with a second vulnerability category based at least on the determination that the first attack vector through which the second vulnerability is exploitable is indicated as the adjacent attack vector;

receive a second request to filter the plurality of vulnerabilities based at least on the second vulnerability category;

in response to receiving the second request to filter the plurality of vulnerabilities based at least on the second vulnerability category, determine that a second portion of the plurality of vulnerabilities are associated with the second vulnerability category; and prevent the second portion of the plurality of vulnerabilities from being presented in the vulnerability management dashboard.

7. The system of claim 1, wherein the one or more processors are further configured to:

determine that a first attack vector through which a second vulnerability of the plurality of vulnerabilities is exploitable is indicated as a network attack vector based at least on the first data about the plurality of vulnerabilities;

associate the second vulnerability with a second vulnerability category based at least on the determination that the first attack vector through which the second vulnerability is exploitable is indicated as the network attack vector;

receive a second request to filter the plurality of vulnerabilities based at least on the second vulnerability category;

in response to receiving the second request to filter the plurality of vulnerabilities based at least on the second vulnerability category, determine that a second portion of the plurality of vulnerabilities are associated with the second vulnerability category; and prioritize the second portion of the plurality of vulnerabilities from being presented in the vulnerability management dashboard.

8. A method for managing vulnerability risks, comprising:
receiving first data about a plurality of vulnerabilities;
causing a vulnerability management dashboard to be presented, the vulnerability management dashboard identifying the plurality of vulnerabilities;
determining that a first vulnerability of the plurality of vulnerabilities is indicated as requiring a high level of privileges to be exploited based at least on the first data about the plurality of vulnerabilities;
associating the first vulnerability with a first vulnerability category based at least on the determination that the first vulnerability of the plurality of vulnerabilities is indicated as requiring a high level of privileges to be exploited;
receiving a request to filter the plurality of vulnerabilities based at least on the first vulnerability category;
in response to receiving the request to filter the plurality of vulnerabilities based at least on the first vulnerability category, determining that a first portion of the plurality of vulnerabilities are associated with the first vulnerability category; and
preventing the first portion of the plurality of vulnerabilities from being presented in the vulnerability management dashboard.

9. The method of claim 8, further comprising:
determining that a second vulnerability of the plurality of vulnerabilities is indicated as requiring a low level of privileges to be exploited based at least on the first data about the plurality of vulnerabilities;
associating the second vulnerability with a second vulnerability category based at least on the determination that the second vulnerability of the plurality of vulnerabilities is indicated as requiring a low level of privileges to be exploited;
receiving a second request to filter the plurality of vulnerabilities based at least on the second vulnerability category;
in response to receiving the second request to filter the plurality of vulnerabilities based at least on the second vulnerability category, determining that a second portion of the plurality of vulnerabilities are associated with the second vulnerability category; and
preventing the second portion of the plurality of vulnerabilities from being presented in the vulnerability management dashboard.

10. The method of claim 8, further comprising:
determining that a second vulnerability of the plurality of vulnerabilities is indicated as requiring no privileges to be exploited based at least on the first data about the plurality of vulnerabilities;
associating the second vulnerability with a second vulnerability category based at least on the determination that the second vulnerability of the plurality of vulnerabilities is indicated as requiring no privileges to be exploited;
receiving a second request to filter the plurality of vulnerabilities based at least on the second vulnerability category;
in response to receiving the second request to filter the plurality of vulnerabilities based at least on the second vulnerability category, determining that a second portion of the plurality of vulnerabilities are associated with the second vulnerability category; and
prioritizing the second portion of the plurality of vulnerabilities in the vulnerability management dashboard.

11. The method of claim 8, further comprising:
determining that a first attack vector through which a second vulnerability of the plurality of vulnerabilities is exploitable is indicated as a physical attack vector based at least on the first data about the plurality of vulnerabilities;
associating the second vulnerability with a second vulnerability category based at least on the determination that the first attack vector through which the second vulnerability is exploitable is indicated as the physical attack vector;
receiving a second request to filter the plurality of vulnerabilities based at least on the second vulnerability category;
in response to receiving the second request to filter the plurality of vulnerabilities based at least on the second vulnerability category, determining that a second portion of the plurality of vulnerabilities are associated with the second vulnerability category; and
preventing the second portion of the plurality of vulnerabilities from being presented in the vulnerability management dashboard.

12. The method of claim 8, further comprising:
determining that a first attack vector through which a second vulnerability of the plurality of vulnerabilities is exploitable is indicated as a local attack vector based at least on the first data about the plurality of vulnerabilities;
associating the second vulnerability with a second vulnerability category based at least on the determination that the first attack vector through which the second vulnerability is exploitable is indicated as the local attack vector;
receiving a second request to filter the plurality of vulnerabilities based at least on the second vulnerability category;
in response to receiving the second request to filter the plurality of vulnerabilities based at least on the second vulnerability category, determining that a second portion of the plurality of vulnerabilities are associated with the second vulnerability category; and
preventing the second portion of the plurality of vulnerabilities from being presented in the vulnerability management dashboard.

13. The method of claim 8, further comprising:
determining that a first attack vector through which a second vulnerability of the plurality of vulnerabilities is exploitable is indicated as an adjacent attack vector based at least on the first data about the plurality of vulnerabilities;

associating the second vulnerability with a second vulnerability category based at least on the determination that the first attack vector through which the second vulnerability is exploitable is indicated as the adjacent attack vector;

receiving a second request to filter the plurality of vulnerabilities based at least on the second vulnerability category;

in response to receiving the second request to filter the plurality of vulnerabilities based at least on the second vulnerability category, determining that a second portion of the plurality of vulnerabilities are associated with the second vulnerability category; and preventing the second portion of the plurality of vulnerabilities from being presented in the vulnerability management dashboard.

14. The method of claim 8, further comprising:

determining that a first attack vector through which a second vulnerability of the plurality of vulnerabilities is exploitable is indicated as a network attack vector based at least on the first data about the plurality of vulnerabilities;

associating the second vulnerability with a second vulnerability category based at least on the determination that the first attack vector through which the second vulnerability is exploitable is indicated as the network attack vector;

receiving a second request to filter the plurality of vulnerabilities based at least on the second vulnerability category;

in response to receiving the second request to filter the plurality of vulnerabilities based at least on the second vulnerability category, determining that a second portion of the plurality of vulnerabilities are associated with the second vulnerability category; and prioritizing the second portion of the plurality of vulnerabilities from being presented in the vulnerability management dashboard.

15. A non-transitory computer-readable medium comprising instructions, that when executed by one or more processors, cause the one or more processors to perform a method for managing vulnerability risks, the method comprising:

receiving first data about a plurality of vulnerabilities;

causing a vulnerability management dashboard to be presented, the vulnerability management dashboard identifying the plurality of vulnerabilities;

determining that a first vulnerability of the plurality of vulnerabilities is indicated as requiring a high level of privileges to be exploited based at least on the first data about the plurality of vulnerabilities;

associating the first vulnerability with a first vulnerability category based at least on the determination that the first vulnerability of the plurality of vulnerabilities is indicated as requiring a high level of privileges to be exploited;

receiving a request to filter the plurality of vulnerabilities based at least on the first vulnerability category;

in response to receiving the request to filter the plurality of vulnerabilities based at least on the first vulnerability category, determining that a first portion of the plurality of vulnerabilities are associated with the first vulnerability category; and preventing the first portion of the plurality of vulnerabilities from being presented in the vulnerability management dashboard.

16. The non-transitory computer-readable medium of claim 15, the method further comprising:

determining that a second vulnerability of the plurality of vulnerabilities is indicated as requiring no privileges to be exploited based at least on the first data about the plurality of vulnerabilities;

associating the second vulnerability with a second vulnerability category based at least on the determination that the second vulnerability of the plurality of vulnerabilities is indicated as requiring no privileges to be exploited;

receiving a second request to filter the plurality of vulnerabilities based at least on the second vulnerability category;

in response to receiving the second request to filter the plurality of vulnerabilities based at least on the second vulnerability category, determining that a second portion of the plurality of vulnerabilities are associated with the second vulnerability category; and prioritizing the second portion of the plurality of vulnerabilities in the vulnerability management dashboard.

17. The non-transitory computer-readable medium of claim 15, the method further comprising:

determining that a first attack vector through which a second vulnerability of the plurality of vulnerabilities is exploitable is indicated as a physical attack vector based at least on the first data about the plurality of vulnerabilities;

associating the second vulnerability with a second vulnerability category based at least on the determination that the first attack vector through which the second vulnerability is exploitable is indicated as the physical attack vector;

receiving a second request to filter the plurality of vulnerabilities based at least on the second vulnerability category;

in response to receiving the second request to filter the plurality of vulnerabilities based at least on the second vulnerability category, determining that a second portion of the plurality of vulnerabilities are associated with the second vulnerability category; and preventing the second portion of the plurality of vulnerabilities from being presented in the vulnerability management dashboard.

18. The non-transitory computer-readable medium of claim 15, the method further comprising:

determining that a first attack vector through which a second vulnerability of the plurality of vulnerabilities is exploitable is indicated as a local attack vector based at least on the first data about the plurality of vulnerabilities;

associating the second vulnerability with a second vulnerability category based at least on the determination that the first attack vector through which the second vulnerability is exploitable is indicated as the local attack vector;

receiving a second request to filter the plurality of vulnerabilities based at least on the second vulnerability category;

in response to receiving the second request to filter the plurality of vulnerabilities based at least on the second vulnerability category, determining that a second portion of the plurality of vulnerabilities are associated with the second vulnerability category; and preventing the second portion of the plurality of vulnerabilities from being presented in the vulnerability management dashboard.

19. The non-transitory computer-readable medium of claim 15, the method further comprising:
    determining that a first attack vector through which a second vulnerability of the plurality of vulnerabilities is exploitable is indicated as an adjacent attack vector based at least on the first data about the plurality of vulnerabilities;
    associating the second vulnerability with a second vulnerability category based at least on the determination that the first attack vector through which the second vulnerability is exploitable is indicated as the adjacent attack vector;
    receiving a second request to filter the plurality of vulnerabilities based at least on the second vulnerability category;
    in response to receiving the second request to filter the plurality of vulnerabilities based at least on the second vulnerability category, determining that a second portion of the plurality of vulnerabilities are associated with the second vulnerability category; and
    preventing the second portion of the plurality of vulnerabilities from being presented in the vulnerability management dashboard.

20. The non-transitory computer-readable medium of claim 15, the method further comprising:
    determining that attack requirements for exploiting a second vulnerability of the plurality of vulnerabilities are indicated as being present based at least on the first data about the plurality of vulnerabilities;
    associating the second vulnerability with a second vulnerability category based at least on the determination that attack requirements for exploiting the second vulnerability are indicated as being present;
    determining that user interaction required to exploit a third vulnerability of the plurality of vulnerabilities is indicated as being active based at least on the first data about the plurality of vulnerabilities;
    associating the third vulnerability with a third vulnerability category based at least on the determination that the user interaction required to exploit the third vulnerability is indicated as being active;
    determining that an exploit maturity associated with a fourth vulnerability of the plurality of vulnerabilities is indicated as being unreported based at least on the first data about the plurality of vulnerabilities;
    associating the fourth vulnerability with a fourth vulnerability category based at least on the determination that the exploit maturity associated with the fourth vulnerability is indicated as being unreported;
    determining that an attack complexity required to exploit a fifth vulnerability of the plurality of vulnerabilities is indicated as being high based at least on the first data about the plurality of vulnerabilities;
    associating the fifth vulnerability with a fifth vulnerability category based at least on the determination that the attack complexity required to exploit the fifth vulnerability is indicated as being high.

\* \* \* \* \*